Figure 5:
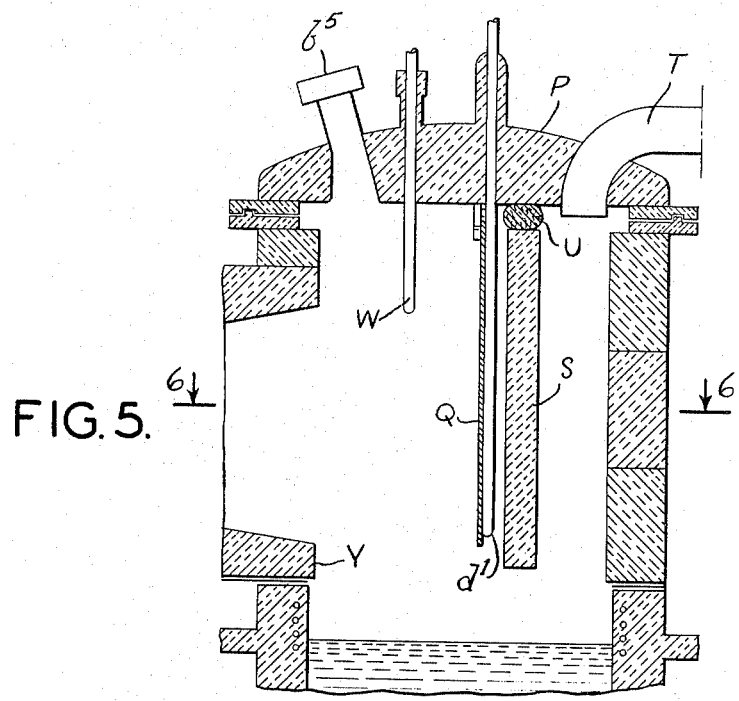

Nov. 22, 1955 F. MATHIEU 2,724,644
METHOD FOR CONDENSING METAL VAPORS
DIRECTLY TO THEIR LIQUID STATE
Filed Sept. 3, 1953 2 Sheets-Sheet 1
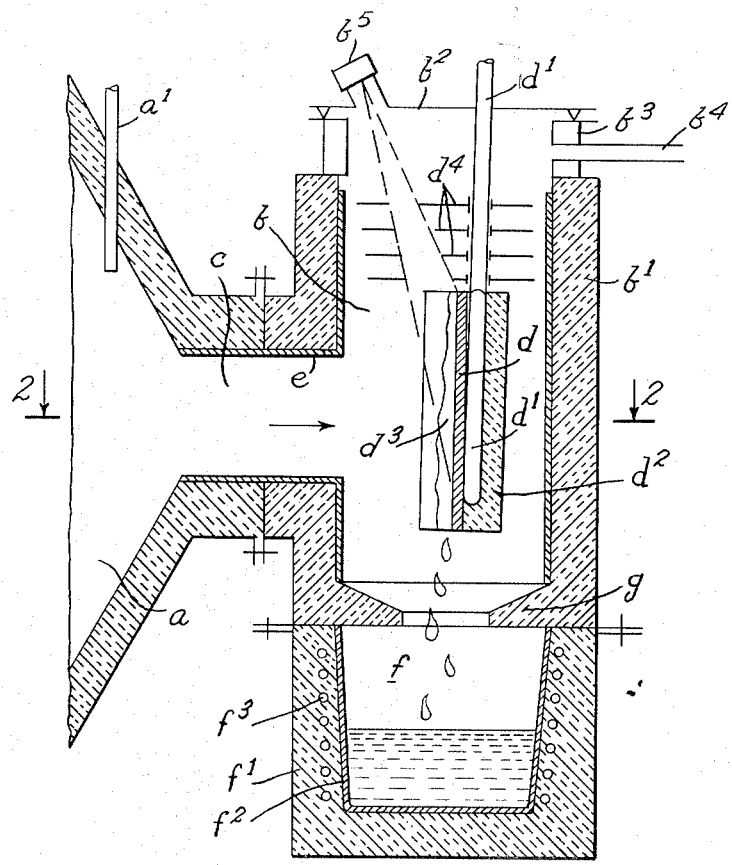
FIG.1.
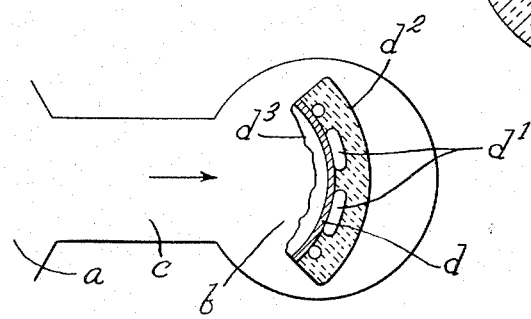
FIG.2.
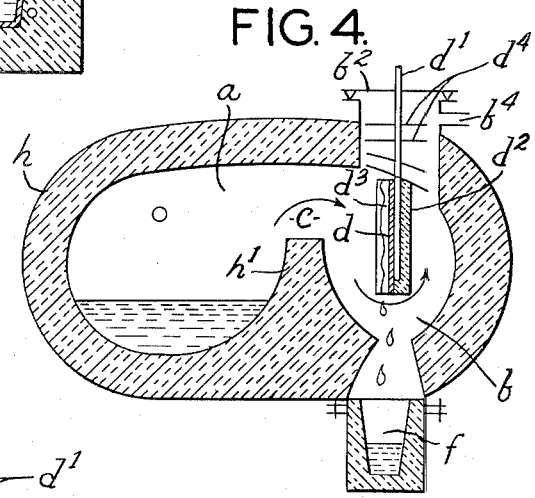
FIG.3.
FIG.4.
INVENTOR
Francois Mathieu
BY
Emery, Varney, Whittemore & Dix
ATTORNEYS Nov. 22, 1955

F. MATHIEU 2,724,644

METHOD FOR CONDENSING METAL VAPORS
DIRECTLY TO THEIR LIQUID STATE

Filed Sept. 3, 1953

2 Sheets-Sheet 2

INVENTOR
François Mathieu
BY
Emery, Varney, Whittemore &
ATTORNEYS Dix

United States Patent Office 2,724,644
Patented Nov. 22, 1955

2,724,644

METHOD FOR CONDENSING METAL VAPORS DIRECTLY TO THEIR LIQUID STATE

Francois Mathieu, Grenoble, France, assignor to Society Astral, Paris, France, a corporation of France Application September 3, 1953, Serial No. 378,305

4 Claims. (Cl. 75—62)

The above named applicant has made an invention or discovery of which the following is a specification.

This application is a continuation-in-part of my application filed July 25, 1950, Serial Number 175,707 now abandoned.

This invention relates to improvements in the condensation of metal vapors directly to their liquid phase and the application of these improvements in the recovery of metals from their ores and in the purification of metals by distillation.

In recovering, for example, such metals as magnesium, zinc, cadmium, lead, tin, aluminum, etc. by dry distillation of their ores in the presence of a reducing agent, there are certain advantages in condensing the evolved metal vapors directly to a liquid condensate rather than to a solid condensate as in the more common procedures. For while, in both cases, the metal is to be ultimately recovered as an ingot, the solid condensate is of an incompact spongy nature and usually contains metallic oxids and other impurities, and therefore has to be re-melted and cast in order to obtain the metal pure and in solid compact form, whereas the liquid condensate is generally free from impurities and may be cast immediately into ingot form. Hence, by direct condensation of the vapor to its liquid phase, the transition from vapor to ingot may be effected in a continuous procedure, whereas in the other case, the necessity of re-melting the solid condensate makes the procedure discontinuous and more expensive.

In practising my invention the condenser, as usual, is continuously cooled below the solidfication temperature of the metal at the pressure to which the vapor is subjected in the condensing chamber; and at the start of an operation, as the incoming vapors from the generating or distilling chamber (or from any other chamber in which the vapors are contained) reach the cold naked surface of the condenser, they will quickly deposit a thin solid condensate film thereon which will gradually, though slightly, build up in thickness. Simultaneously with this slight increase in thickness, the temperature of the film surface (that is, the surface of the film which is exposed to the incoming vapors and with which exposed surface the vapors now come into direct contact) will gradually rise. Thus the cooling effect of the condenser proper on the incoming vapors, now that the condenser is shielded from direct contact with the vapors by said film, will gradually diminish, so that very soon after the operation is started the temperature of said film surface will reach the triple-point temperature of the metal being treated, where, if the pressure in the condensing zone is the same, or substantially the same, as the triple-point pressure of the metal being treated, the solid, liquid and vapor phases of that metal will then be in equilibrium. I have found that if the pressure in the condensing zone is normally maintained substantially above the triple-point pressure of the metal being treated say, for example, at five or more times its triple-point pressure, the maximum thickness of said film will be less, and the temperature of its exposed face will rise above the triple-point temperature of the metal more quickly, than if the pressure in the condensing zone remains close to its value at the triple-point, with the result that, as soon as the temperature of said exposed surface has passed beyond the triple-point temperature of the metal, the vapors will immediately begin to condense to liquid form, and the heat of the oncoming vapors at any moment will be exactly balanced by the cooling effect of the condenser; and, further, that this equilibrium will continue so long as the vapor flow-rate remains unchanged. While this condition of equilibrium continues the vapors will condense directly to liquid form on the exposed surface of the solid condensate film and drip from said film and may be collected in a suitable crucible underneath. Moreover, if there is any change in the vapor flow-rate after this condition of equilibrium has been established, it will be accompanied by an increase or decrease in the thickness of the solid condensate film which, in turn, will decrease or increase the cooling effect of the condenser, thus tending to restore the condition of equilibrium just described, where the heat of the incoming vapors is in balance at each moment with the cooling effect of the condenser. Thus by maintaining the normal pressure in the condenser zone substantially above that of the triple-point pressure of the metal being treated, the solid condensate film on the condenser acts as an automatic regulator to maintain constantly the conditions required for continuously condensing the vapors directly to liquid form. When the metal to be condensed has a triple-point pressure lower than 0.06 mm. Hg, the pressure in the condensing zone must be substantially maintained at least at 0.3 mm. Hg absolute to obtain the above stated results. Thus the solid layer deposited on the condenser plate will not exceed substantially 2 to 3 cm. in thickness.

In order that the solid condensate film shall act the more effectively to automatically maintain the equilibrium aforesaid, I have found that it is quite important that some means be provided to control the velocity at which the metal vapors and other gases flow from the generating or distilling chamber into the condensing chamber. The immediate purpose of such means is to forestall a too violent flow of vapor which would cause turbulence in the condensing zone and thus disturb the condensation of the vapor on the exposed surface of said film. In accordance with my invention, I have applied here the same principle frequently applied in fluid dynamics for preventing "cavitation" and like phenomena. This principle has already been developed in the art of fluid dynamics and consists in determining the area of a conduit connecting two chambers, from one of which gas is drawn through said conduit to the other, by reducing the pressure in the latter, the area of said conduit being so determined that the ratio of the pressure in the former chamber to that in the latter chamber will always be less than 1/0.52. I have found, in short, that by making the area of the conduit connecting the generating or distilling chamber with the condensing chamber, so that the pressure in the generating or distilling chamber will always be less than 1/0.52 times the pressure in the condensing chamber, the solid condensate film will act most effectively as the automatic regulator aforesaid.

Figure 6:
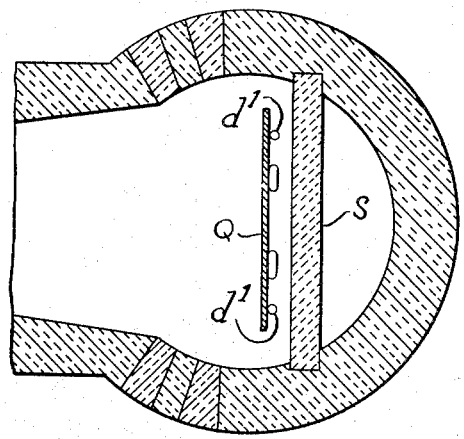

To illustrate how my invention may be usefully applied, for example, in the dry distillation of metal ores, I have shown, more or less diagrammatically in the accompanying drawings, some forms of apparatus for practicing the same. With respect to one such form, Fig. 1 is a vertical section through the condensing chamber and the conduit connecting that chamber with the distilling or vapor-generating chamber, the latter being shown in part only; Fig. 2 is a horizontal section on the plane indicated by the line 2—2 of Fig. 1; Fig. 3 is a detail view in elevation of the rear side of the condensing plate and the cooling coil of the condenser; Fig. 4 is a vertical section through another form of apparatus; Fig. 5 is a vertical section through still another form of apparatus; and Fig. 6 is a horizontal section through the apparatus of Fig. 5.

Referring first to Figs. 1 to 3, the distilling oven or chamber $a$ (which will generally be provided with a pipe $a'$ for the introduction of an inert gas, such as hydrogen) communicates with the condensing chamber $b$ through a conduit $c$. Within chamber $b$ and facing the outlet of conduit $c$ is a plate $d$ preferably of only moderately good heat-conducting material and of rectangular shape as shown in Fig. 3, though slightly curved as shown in Fig. 2 so that its front face, which is directly opposite the discharge end of conduit $c$, will be concave. The surface area of plate $d$ is considerably greater than the cross-sectional area of the discharge end of the conduit $c$, and its horizontal dimension is sufficient to bring its sides fairly near the interior walls of chamber $b$ so that said plate will act as a baffle in the path of the vapors and non-condensing gases entering chamber $b$, to the end that the non-condensing gases will be required, for the most part, to pass below and around the bottom of plate $d$ before being drawn into the exhaust pipe $b^4$. To the other or rear face of plate $d$ a coil $d'$ is welded for the circulation of a cooling liquid; and the rear face of said plate, together with the cooling coil, are preferably heat insulated as indicated at $d^2$. Said plate, coil and insulation $d^2$ constitute what may be collectively referred to herein as the condensing element or the condenser. By placing the exhaust pipe $b^4$ near the top of chamber $b$, as shown in Fig. 1, and on the far side of that chamber opposite the side where the vapors and gases enter it, and providing the heat insulation $d^2$ on the rear of plate $d$, the likelihood of vapors condensing on the rear of the condenser is minimized.

The condensing chamber $b$ is provided with a heat insulating jacket $b'$ and may be equipped at the top with a removable cover $b^2$ for inspection and cleaning, and with a water-circulation jacket $b^3$ for cooling the point of entry of the exhaust pipe $b^4$ which connects with an exhaust pump (not shown) and through which the non-condensing gases are discharged from the system.

Sheet-metal fins $d^4$ (which act as heat screens and also as vapor traps separating the roving vapors from the non-condensing gases, by which the vapors are swept along as the gases are sucked into the exhaust pipe $b^4$) may be slipped onto and thermally insulated from the intake and discharge ends of the cooling coil $d'$. The ends of this coil pass through the cover $b^2$ which supports the coil as well as the plate $d$ and the fins $d^4$, so that when the cover is removed for inspection or cleaning, said fins, plate and coil may be lifted away together. A viewing glass $b^5$ may also be provided for observing the conditions at the front face of the condensing plate $d$ while the apparatus is in operation. As shown in Fig. 1, this glass is mounted on the top of cover $b^2$ and the portions of the fins $d^4$ which are in the line of sight between said glass and said plate are cut out and removed as indicated in that figure. It is apparent that said cover may, if desired, be located at the side rather than at the top of the condensing chamber.

The conduit or passage $c$ is preferably circular in cross-section; and, as already stated, its dimensions are preferably such that the metal vapors and other gases drawn from chamber $a$ into chamber $b$, due to the contraction in volume of the vapors in chamber $b$ by the condensation of these vapors, will cause the pressure in chamber $a$ to remain always below 1/0.52 times the pressure in chamber $b$, in order to prevent turbulence in the condensing zone adjacent to the film $d^3$. With a proper adjustment of the size of the plate $d$ relative to the cross-sectional area of the conduit $c$, together with suitable regulation of the heat imput, liquid metal forming at the top of and dripping from or running down said plate will not be vaporized by radiations from the chamber $a$.

Chamber $b$ and conduit $c$ are lined, as indicated at $e$, with good heat-conducting material such as steel-plate, cast iron, Carborundum bricks, etc. This lining absorbs heat from chamber $a$ so that the interior surface of chamber $b$ is brought, by conducted and radiated heat, to a temperature higher than that at which the vapors can condense on it.

In operation, the vacuum pump is driven continuously, not only to draw the inert gas and other non-condensing gases from the system, but also to maintain the pressure in chamber $b$ or the condensing zone at the degree required; for the pull of the pump is so adjusted as to maintain the pressure in chamber $b$ at the degree required, that is, at a pressure greater than 0.3 mm. of Hg absolute and at least as high as five times the triple-point pressure of the metal being treated. A cooling liquid is continuously circulated in the coil $d'$ (which may be provided with means, not shown, to control the rate of circulation) to keep the condensing plate $d$ cooled to or below the solidification temperature of the metal at the pressure in the condensing chamber. The metal vapors first coming in contact with the plate $d$ will condense to a solid and thereby deposit on the front face of said plate a solid condensate film (denoted by $d^3$ in Fig. 1); and by regulating the pump so as to keep the pressure in chamber $b$ constantly at the degree aforesaid, the incoming vapors which thereafter impinge on the surface of said film will continuously condense to liquid form on said surface in the manner and for the reasons previously explained. The liquid metal which then drips from the surface of the film $d^3$ may be collected in a crucible $f^2$ in a chamber $f$ located at the bottom of the condensing chamber directly below the plate $d$; and this crucible may be heat-insulated as indicated at $f^1$ and kept at a predetermined temperature by an electric resistor $f^3$ provided in the walls of the chamber $f$ and controlled by a thermostat (not shown). This temperature should be equal to or slightly higher than the triple-point of the metal. And to shield the crucible and its contents from heat radiations from chamber $b$, the opening at the bottom of that chamber through which the liquid metal drops is restricted by a plate $g$ having a small opening for these drippings to pass through.

In the embodiment of the apparatus shown in Fig. 4, the condensing chamber $b$ and the reducing or distillation chamber $a$ are more compactly arranged within the same casing or jacket; and the two chambers are thus very closely adjacent being separated merely by a sill $h'$ which acts as a deflector and thermal screen and which is disposed directly below the opening $c$ between the two chambers and opposite which a vertical condensing plate $d$ is placed similar to and cooled by the same means as the plate $d$ of Fig. 1.

In the embodiment of the apparatus shown in Figs. 5 and 6, the cooling coil marked $d'$ is the same as the cooling coil similarly marked in Figs. 1 and 3. The cover P is of melted cement and chamotte concrete, and replaces the cover $b^2$ and fins $d^4$ of Fig. 1. A flat plate Q is substituted for the condensing plate $d$ of Figs. 1 and 2. The insulation $d^2$ shown in Figs. 1 and 2 on the rear side of the plate $d$ is omitted in Figs. 5 and 6, and in lieu a Carborundum partition S is placed directly back of plate Q. A tube T extending through the cover P replaces the pipe $b^4$ of Fig. 1 which leads from the far side of the condensing chamber to the exhaust pump for the discharge of the non-condensing gases. A soft buffer U is disposed between the cover P and the top of the partition S, and a pyrometer W extends through the cover P. The lower end of the condensing chamber, as indicated at Y, is more open than the corresponding part of the condensing chamber of Fig. 1 which is provided with the shield $g$. The interior of the combustion chamber has no metallic lining, such as is indicated at $e$ in Fig. 1.

Example I.—Condensation of zinc vapor

As a specific example of my process, let is be assumed that the process is to be used to distil zinc from an alloy having the approximate composition: Zn 90%, Al 9.95%, Fe and Si 0.05%; and that it is desired that the operation be conducted under low pressure in an apparatus of the type illustrated in Figs. 1-3, having a capacity to distil 100 kg. of zinc per hour. At the outset, the pipe $a'$ is closed; and the cross-section of the conduit $c$ is restricted in order to prevent the flow of the zinc vapor into the condensation chamber $b$, at so rapid a rate as to cause the vapor stream to break up and thus fail to be delivered intact to and against the condenser plate $d$. By preliminary tests made before an operational run, the maximum permissible cross-section area of the conduit $c$ for distilling zinc under these conditions is ascertained and can be readily determined to be approximately 6 sq. dm. for an apparatus of the aforesaid capacity. Moreover, notwithstanding the restriction of the rate of vapor flow to chamber $b$, the walls of the latter will become heated sufficiently to prevent the zinc vapor from condensing thereon. For distilling a different metal under like conditions, the cross-section area of the conduit $c$ may be determined in a similar manner. Besides adjusting the area of conduit $c$ conformably to a given capacity of apparatus, there is still another apparatus variable to be adjusted, namely, the surface area of the front face of the condenser plate $d$. For an apparatus of the aforesaid capacity for distilling zinc, the area of the front face of the plate $d$ will be adequate if approximately 16 sq. dm. Having made these adjustments in the apparatus, the furnace $a$ is now charged with the alloy aforesaid, a cooling liquid is circulated in the coil $d'$, and the vacuum pump is started in operation. Before the vapors begin to evolve in the furnace, the plate $d$ is cooled below the solidification temperature of the zinc at this early stage to from 200 degrees to 300 degrees C., by regulating the flow of the cooling liquid. Having regulated the flow of cooling liquid the operator now adjusts the pull of the pump so that the pressure in the condensing chamber $b$ soon becomes substantially greater than the triple-point pressure for zinc, that is to say, preferably between 0.75 and 1.5 mm. Hg which is from five to ten times the vapor tension of zinc vapor at the triple-point, that is, five to ten times 0.15 mm. Hg. When the first vapors evolve and impinge upon the condenser plate they form a solid film on its front face. Zinc boils at 930 degrees C. at atmospheric pressure; but since the reduced pressure in chamber $b$ will reduce the pressure in the furnace $a$, the maintenance in the furnace of a temperature of about 800 degrees C. will cause the zinc to distil. During the operation the thickness of the solid zinc film on the front face of plate $d$ will gradually increase until it becomes thick enough to thermally insulate said plate; and when the surface of the film facing the flow of vapor reaches the triple-point temperature for zinc (419.4 degrees C.) the fresh vapor striking the film will be converted immediately into liquid and stream down into the vessel $f$ beneath.

Example II.—Condensation of magnesium vapor

During the silicothermic reduction of dolomite for magnesium production, 30 kgs. of said metal can be produced per hour and condensed to liquid state in an apparatus similar to that of Fig. 1. The furnace is heated to 1300° C. and the section of the conduit $c$ through which the magnesium vapor flows is 15 sq. dm. The condenser plate $d$, with an area of 30 sq. dm., makes it possible to obtain a temperature of 400 to 500 degrees C. as a starting temperature which then increases as the thickness of the solid magnesium layer grows till the triple-point temperature (650° C.) is reached. During the operation, the pressure in the condensing zone is kept between 10 and 25 mm. Hg, that is, five to ten times the magnesium vapor tension corresponding to the triple-point which is 2 mm. Hg.

Example III.—Condensation of sodium vapor

The temperature of the distilling oven should be about 800° C. Since the tension of sodium vapor at the triple-point (98° C.) is very low, the pressure in the condensing zone should be kept at about 0.5 mm. Hg. The condenser plate is preferably a thin sheet and the turns of the cooling coil are preferably in contact with each other, so that the temperature of the face of said plate on which the vapors impinge will be about 40° C. For the same output of zinc obtained in Example I, the cross section area of the conduit $c$ and the area of the condenser plate should be about twice those respective areas given in Example I.

Example IV.—Condensation of aluminum vapor

The temperature of the distilling oven should be from 1350° to 1400° C. Since the triple-point temperature of aluminum is 659° C. and the corresponding pressure almost zero, the pressure in the condensing zone should be kept at 0.3 mm. Hg. The turns of the cooling coil are preferably spaced apart from each other to obtain a temperature of about 500° C. on the face of the condenser plate exposed to the vapors; and it is helpful to provide two superposed condenser plates. In order to condense 30 kgs. per hour, the cross section area of conduit $c$ should be about 18 sq. dm. and the area of the face of the condenser plate about 40 sq. dm.

As hereinbefore stated, the furnace or oven $a$ may be provided with means for the introduction of a non-condensing gas, such as hydrogen. This is in accordance with a general and customary practice in the art of metal distillation in order to promote or assist in the flow of the metal vapors evolved; and the gases which are customarily employed for this purpose (which include nitrogen, carbon monoxide etc. etc., as well as hydrogen) may be used here. In any case, however, where no such gas is intentionally introduced in practicing the present process, non-condensing gases will often develop from the material treated or from the refractories of the furnace, as well as other gases which are necessarily entrained from the outside owing to the practical difficulty of making the furnace air-tight, in which latter case slight amounts of non-condensing gases will be present in the metal vapor, such as air, nitrogen, oxygen and traces of moisture (water vapor).

My method is applicable to the distillation of all metals whose melting points lie between 50 and 1000 degrees C. For metals having melting points lower than 50 degrees C., my method would be theoretically practicable but without industrial importance; for metals having melting points above 1000 degrees C., it would be too difficult to maintain at that temperature the walls of the condensing chamber which are heated merely by the radiation of the oven and the heat conductivity of the lining. I can therefore assert that my method may be used for the distillation of potassium, sodium, lithium, calcium, strontium, barium, magnesium, zinc, cadmium, bismuth, aluminum, indium, thallium, tin, lead, germanium and silver.

It will be understood, of course, that if the condensation of the metal vapors is not to be continuous with their generation, a vapor storage chamber will generally replace the generating chamber $a$.

I claim as my invention:

1. In the distillation of any metal having a melting point between 50 and 1000 degrees centigrade, a method for the condensation of the vapor of said metal which comprises continuously drawing the vapor from a generating, distilling or storage chamber to a condensing chamber containing a condensing element, adjusting the temperature of said element at the beginning of the condensation so that a solid film of the metal will always be present on said element, then continuously maintaining in the condensing chamber a pressure greater than 0.3 mm. Hg absolute and at least five times the triple-point pressure of said metal, and permitting the liquid metal condensate, as it forms, to drop by gravity from the condensing element into a receptacle outside the condensing chamber.

2. The method of claim 1 in which the pressure of the vapor immediately prior to its introduction into the conduit connecting the distilling or storage chamber and the condensing chamber is lower than 1/0.52 times the pressure in the condensing chamber.

3. A method for the condensation to liquid form of the vapor of any metal whose melting point is between 50 and 1000° C., which comprises causing a stream of the vapor to impinge upon a cooled surface within an enclosing chamber, and so regulating the heat exchange between said surface and the vapor that a solid film of said metal will always be present on said surface, while pressure greater than 0.3 mm. Hg absolute and at least five times greater than the triple-point pressure for said metal is maintained in said chamber whereby the treated vapor passes directly into the liquid stage.

4. The method of claim 3 in which at the start of condensation the vapor exposed to the condensing element is cooled thereby to a temperature at which the metal forms a solid film on said element.

References Cited in the file of this patent

UNITED STATES PATENTS

| | | |
|---|---|---|
| 2,239,370 | Osborn et al. | Apr. 22, 1941 |
| 2,312,811 | Gentil | Mar. 2, 1943 |
| 2,615,706 | Davey | Oct. 28, 1952 |